United States Patent
Shiono et al.

(10) Patent No.: US 7,614,674 B2
(45) Date of Patent: Nov. 10, 2009

(54) CONSOLE BOX

(75) Inventors: Masamitsu Shiono, Utsunomiya (JP);
Taku Kamiya, Utsunomiya (JP);
Manabu Koarai, Haga-gun (JP)

(73) Assignees: Honda Motor Co., Ltd., Tokyo (JP);
Moriroku Company, Ltd., Tokyo (JP)

( * ) Notice: Subject to any disclaimer, the term of this patent is extended or adjusted under 35 U.S.C. 154(b) by 0 days.

(21) Appl. No.: 12/205,164

(22) Filed: Sep. 5, 2008

(65) Prior Publication Data
US 2009/0066102 A1 Mar. 12, 2009

(30) Foreign Application Priority Data
Sep. 10, 2007 (JP) ............................. 2007-234736
Sep. 10, 2007 (JP) ............................. 2007-234737

(51) Int. Cl.
*B60R 7/04* (2006.01)
(52) U.S. Cl. ...................... 296/24.34; 296/37.8; 70/158
(58) Field of Classification Search ............. 296/24.34, 296/37.8; 70/158, 159, 160
See application file for complete search history.

(56) References Cited

U.S. PATENT DOCUMENTS 4,890,735 A * 1/1990 Fukumoto .................. 312/9.28
7,163,248 B2 * 1/2007 Adams et al. ............ 296/24.34

FOREIGN PATENT DOCUMENTS

JP 06-099775 4/1994

* cited by examiner

*Primary Examiner*—Lori L Lyjak
(74) *Attorney, Agent, or Firm*—Rankin, Hill & Clark LLP (57) ABSTRACT

This console box is provided with: a box main unit; and a locking mechanism, wherein the locking mechanism is provided with: a locking groove provided on one of the box main unit and the console lid; a locking pin provided on the other of the box main unit and the console lid, the locking pin being fit into the locking groove when the console lid is closed, and having a fitting portion dimension smaller than the groove width of the locking groove; and a biasing device provided between the box main unit and the console lid which biases the console lid in an opening direction by contacting between the locking pin and one of wall formed in the locking grove when the console lid is in a closed state.

4 Claims, 11 Drawing Sheets

CONSOLE BOX

Priority is claimed on Japanese Patent Application No. 2007-234736, filed on Sep. 10, 2007, and No. 2007-234737, filed on Sep. 10, 2007, the contents of which are incorporated herein by reference.

BACKGROUND OF THE INVENTION

1. Field of the Invention

The present invention relates to a console box installed in a vehicle interior for containing small articles and the like therein.

2. Description of the Related Art

In a console box installed between left and right seats in a vehicle interior, a console lid is rotatably attached to a console box main unit with an opening for containing goods, the console lid covering the opening of the console box main unit. A console lid of this type is arranged at a position in the vicinity of an elbow portion of an occupant seated on a seat. Therefore, the console lid is used as an armrest or a container portion of a cup holder. In this case, it is desired that the console lid not only be rotatable for opening/closing the opening of the box main unit, but also be slidable in the front-back direction.

Consequently, there is conventionally proposed a console box in which a console lid is rotatable and also is slidable in the front-back direction (for example, see Japanese Unexamined Patent Publication, First Publication No. H06-99775).

This console box includes: a lid base for rotatably supporting a console lid over a box main unit; and a lid cover slidably back-and-forth provided on this lid base. The back-and-forth slide of the lid cover and the rotation with respect to the lid base are locked by a locking mechanism. To a front end portion of the console lid, there is provided an operation lever so that an occupant hooks his or her hand over it from above to perform a pull-up operation. The pull-up operation on the operation lever can release the locking mechanism.

However, the conventional console box has a mechanism in which the pull-up operation on the operation lever releases the lock both the back-and-forth slide operation and the rotation operation of the console lid. As a result, if the console lid is intended to be slid in the front-back direction with the hand rested over the operation lever, a slight difference in the way the force is put sometimes leads to a rotation and opening of the console lid, leaving room for improvement in operability.

To address the above problem, it may be considered to provide a locking mechanism for the back-and-forth slide operation of the console lid and a locking mechanism for the rotation operation thereof, and further provide release operation levers which respectively correspond to the locking mechanisms. However, in this case, the number of parts is increased and the mechanism becomes complicated, leading to apprehension that the production cost will be high.

Therefore, the present invention has a first object to provide a console box that is capable of preventing an erroneous operation between the slide operation and the rotation operation of the console lid without inviting further complication of the mechanism and an increase in the number of parts.

A locking mechanism of a conventional console box is made of, for example: a locking groove provided in one of a box main unit and a console lid; and a locking pin provided in the other of the box main unit and the console lid, in which the locking pin fits into the locking groove when the console lid is closed (for example, see Japanese Unexamined Patent Publication, First Publication No. H06-99775).

In a console box which adopts this locking mechanism, locking operability can be made favorable by enlarging the difference between a groove width of the locking groove and a fitting portion dimension (an outer diameter) of the locking pin. However, in this case, clearance between the locking groove and the locking pin becomes large in the locked state and thereby invites a looseness of the console lid. Meanwhile, if the difference between the groove width of the locking groove and the fitting portion dimension of the locking pin becomes small so as to reduce the looseness, the operability becomes worse.

Therefore, the present invention has a second object to provide a console box that is capable of preventing looseness of a console lid when it is locked without inviting worsening of a locking operability.

SUMMARY OF THE INVENTION

A console box of the present invention includes: a box main unit with an opening in an upper portion thereof, one end of a console lid which openably covers the opening being axially supported on the box main unit by a hinge axis; and a locking mechanism for restricting a separation between the box main unit and the console lid when the console lid is closed, wherein the locking mechanism is provided with: a locking groove provided on one of the box main unit and the console lid; a locking pin provided on the other of the box main unit and the console lid, the locking pin being fit into the locking groove when the console lid is closed, and having a fitting portion dimension smaller than the groove width of the locking groove; and a biasing device provided between the box main unit and the console lid which biases the console lid in an opening direction by contacting between the locking pin and one of wall formed in the locking grove when the console lid is in a closed state.

In this case, when the console lid is closed to fit the locking pin into the locking groove, the console lid can be relatively displaced with respect to the box main unit by the difference between the fitting portion dimension of the locking pin and the groove width of the locking groove. At this time, the console lid is biased in the opening direction by the biasing device. Therefore, the locking pin is maintained in contact with one wall of the locking groove.

As described above, according to the present invention, the fitting portion dimension of the locking pin is set to be smaller than the groove width of the locking groove, and the biasing device is provided between the box main unit and the console lid for biasing the console lid in the opening direction when the console lid is closed. Therefore, the difference between the fitting portion dimension of the locking pin and the locking groove can be enlarged to make locking operability favorable. In addition, the locking pin fit into contact with one wall of the locking groove by a bias on the console lid by the biasing device, to thereby make it possible to reliably prevent looseness of the console lid when it is locked. Consequently, the above second object described can be achieved.

The console box of the present invention may further includes a restriction device in order to restrict an excessive displacement in a closing direction of the console lid which is provided on at least one of the box main unit and the console lid, on a side further away from the hinge axis than the biasing device.

In this case, in a closing operation of the console lid, a rotational displacement of the console lid is permitted until the displacement of the console lid is restricted by the restriction device. During that time, the locking pin is fit into the locking groove.

Therefore, in a closing operation of the console lid, since a rotational displacement of the console lid is permitted until the displacement of the console lid is restricted by the restriction device, a fitting state between the locking pin and the locking groove can be set and adjusted with ease.

In the console box of the present invention, a slidability may be provided between the biasing device and the box main unit with which the biasing device comes in contact.

In this case, with the slidability between the biasing device and the box main unit, it is possible to suppress sound of interference between the console lid and the box main unit when the console lid is closed. Furthermore, because flexibility of the biasing device becomes favorable when the console lid is pressed from above, it is also possible to suppress the occurrence of wear and rubbing sound of the box main unit.

In the console box of the present invention, the console lid is provided with: a lid base rotatably hinge-coupled to the box main unit; a lid cover provided on the lid base so as to be slidable in back-and-forth direction; and an operation lever rotatably attached to the lid cover for releasing the locking mechanism by a pull-up operation with a hand hooked from above, and wherein a lower end of a grip portion of the operation lever is positioned lower than a rotation axis of the operation lever in a state before the locking mechanism is released.

According to the above console box, when the opening of the box main unit is opened by a rotation of the console lid, a hand is hooked over the grip portion of the operation lever from above, and the operation lever is pulled upward about the rotation axis, to thereby release the rotational locking mechanism. Meanwhile, when the console lid is slid back-and-forth, a hand is hooked over the grip portion of the operation lever, and force is applied to the console lid so as to push and pull it in the front-back direction. At this time, the lower end of the grip portion of the operation lever is positioned lower than the rotation axis of the operation lever. Therefore, as long as a pull-up operation is not intentionally performed, the rotational locking mechanism is not released.

Accordingly, as long as the operation lever gripped from above is not intentionally pulled upward with the lower end of the grip portion of the operation lever located lower than the rotation axis of the operation lever in a state before the rotational locking mechanism is released, the rotational locking mechanism is not released. Consequently, a sliding back-and-forth operation and a rotation operation of the console lid can be obtained with no erroneous operation, without inviting further complication of the mechanism and an increase in the number of parts. Therefore, the above-mentioned first object can be achieved.

DETAILED DESCRIPTION OF THE INVENTION

Hereunder is a description of one embodiment of the present invention. In the following description, "back-and-forth" and "up-down" mean "back-and-forth" and "up-down" with respect to a present vehicle, unless otherwise specified.

Figure 1:
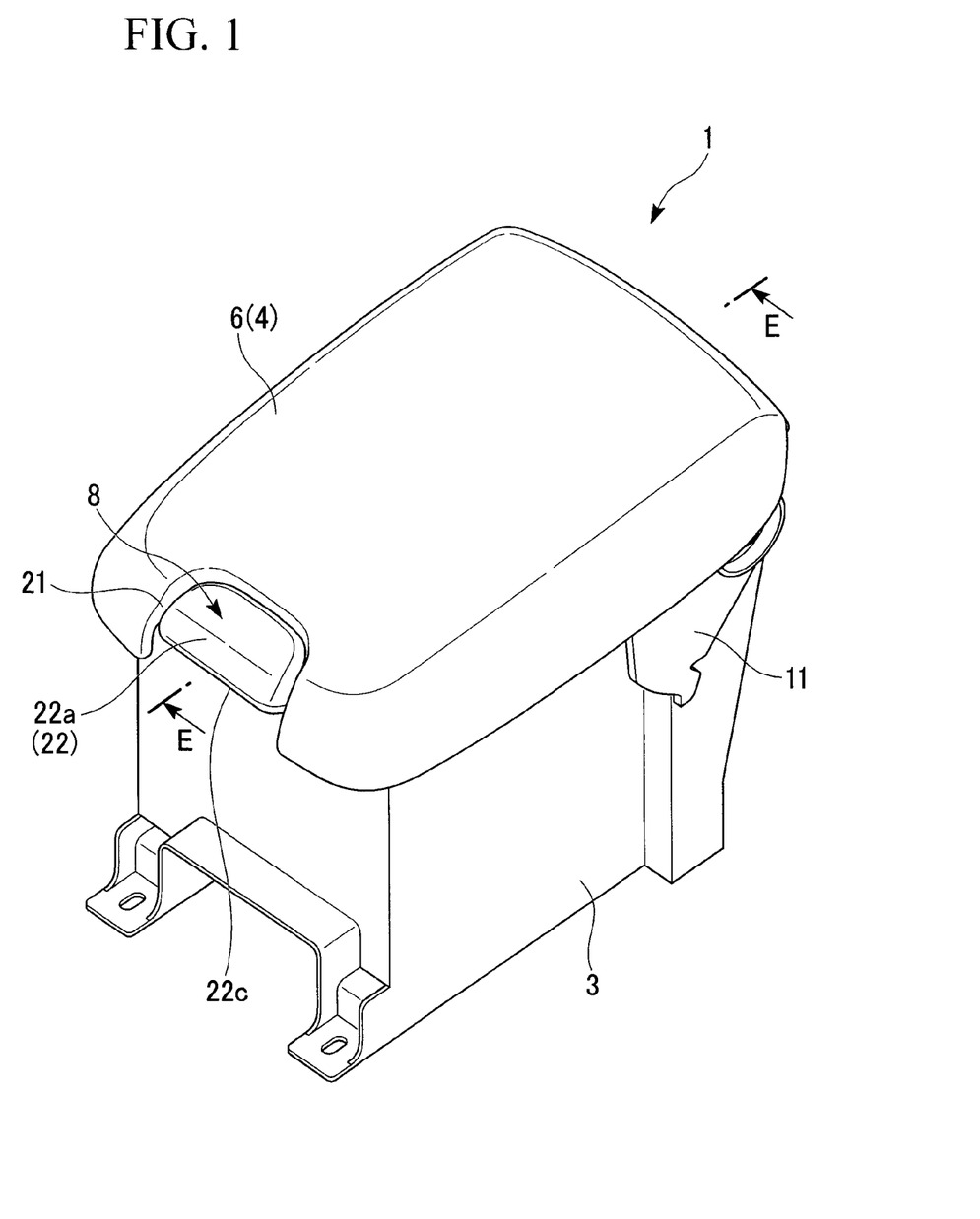
FIG. 1 is a perspective view of a console box of one embodiment of the present invention.
Figure 2:
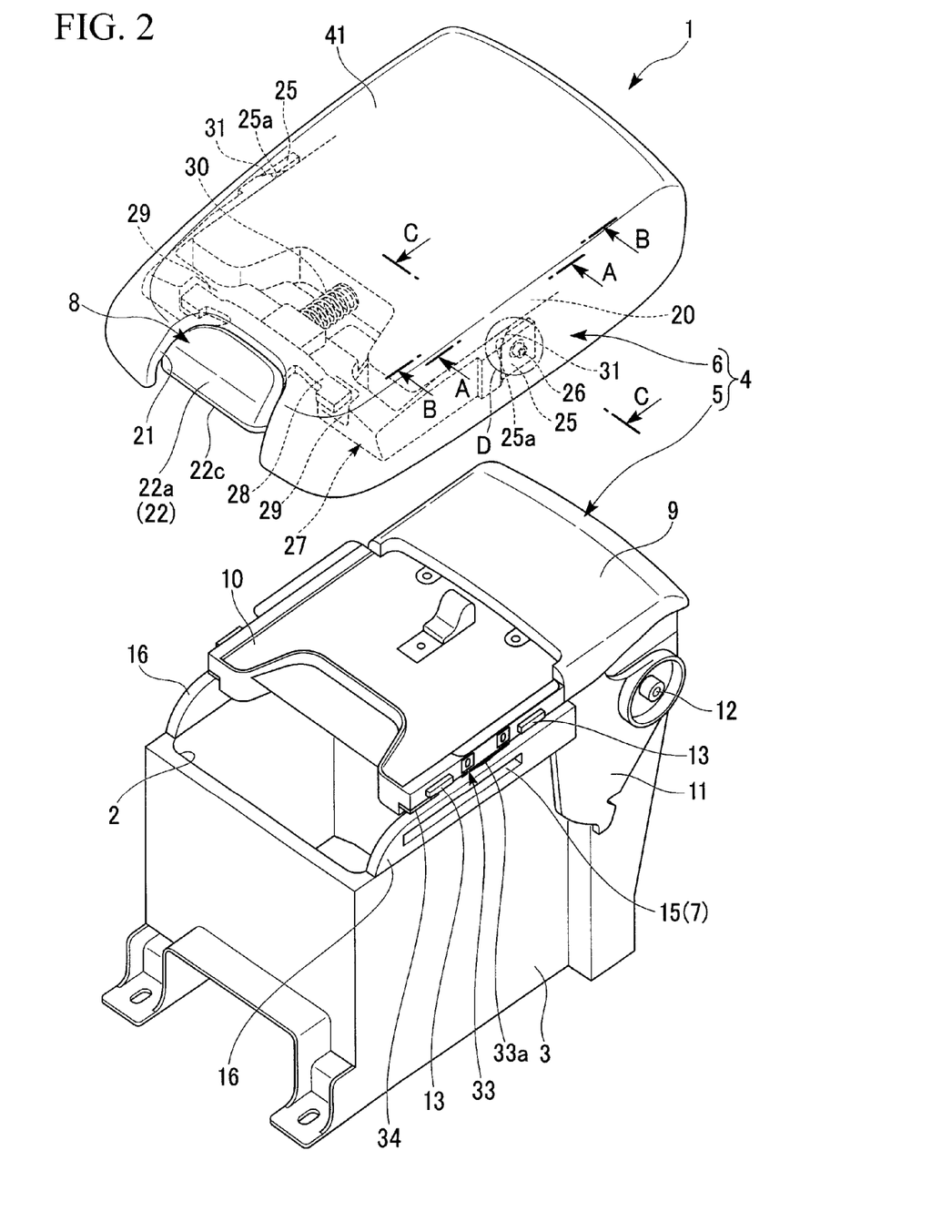
FIG. 2 is an exploded perspective view of the console box.

FIG. 1 is a perspective view of a console box 1 according to the present invention and FIG. 2 is an exploded perspective view of the console box 1. The console box 1 is installed, for example, on a floor tunnel between the driver's seat and the front passenger seat within a vehicle interior.

The console box 1 is provided with: a cuboid box main unit 3 with an opening 2 in an upper portion thereof for containing goods; and a console lid 4 rotatably supported on a rear end side of the box main unit 3 so as to be capable of opening/closing the upper portion of the opening 2.

The console lid 4 includes: a lid base 5 which is rotatably hinge-coupled to the rear end portion of the box main unit 3, covering an approximately 80% region of a the opening 2 of the box main unit 3 from a rear end portion to a front side; a lid cover 6 which is back-and-forth slidably attached to the lid base 5 for covering the whole region of the opening 2 of the box main unit 3 above the lid base 5; rotational locking mechanisms 7 for locking a rotation with respect to the box main unit 3 in a state with the opening 2 closed; and an operation lever 8 for releasing the lock by the rotation locking mechanisms. On an upper side of the lid cover 6, there is provided a cushion material 40 (see the cross-sectional view of FIG. 10) and the top surface side and the lateral portion of the cushion material 40 is covered by a skin material 41 so as to wrap the cushion material 40. In the case of the console box 1 of the embodiment, the lid cover 6 functions as an armrest capable of sliding back-and-forth.

Figure 3:
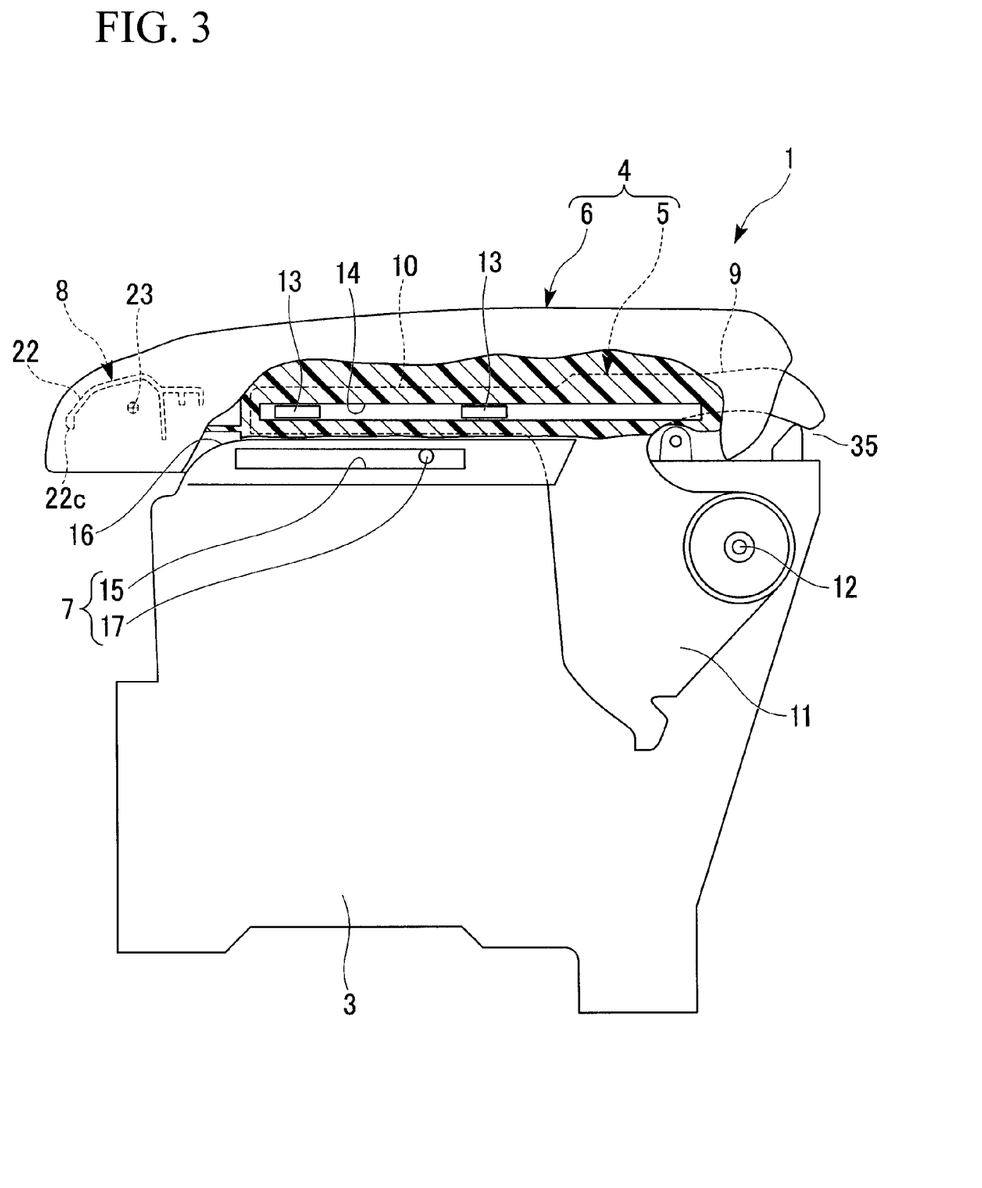
FIG. 3 is a side elevational view of a part of the console box, exploded along the A-A portion of FIG. 2.
Figure 4:
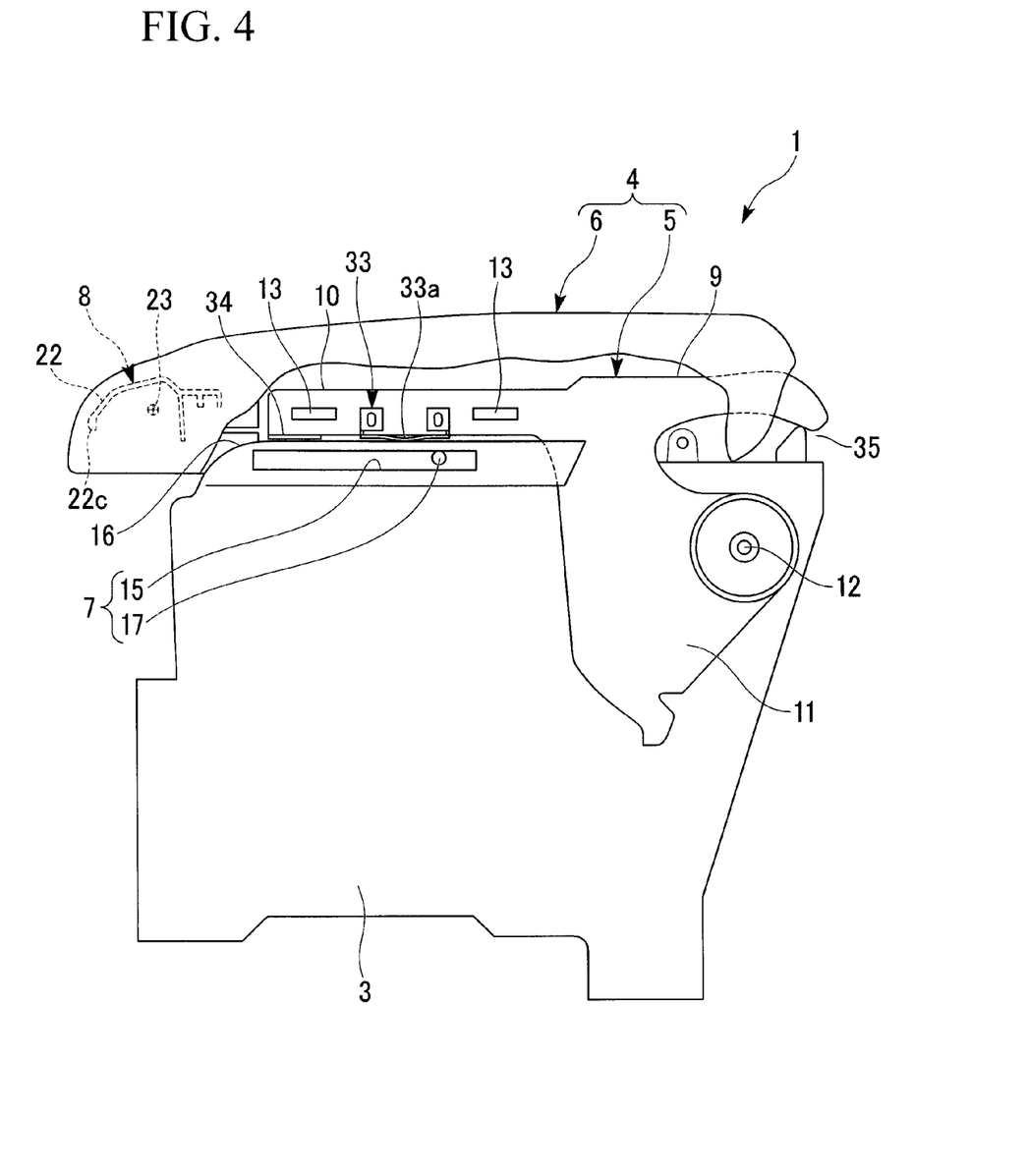
FIG. 4 is a side elevational view of a part of the console box, exploded along the B-B portion of FIG. 2.
Figure 5:
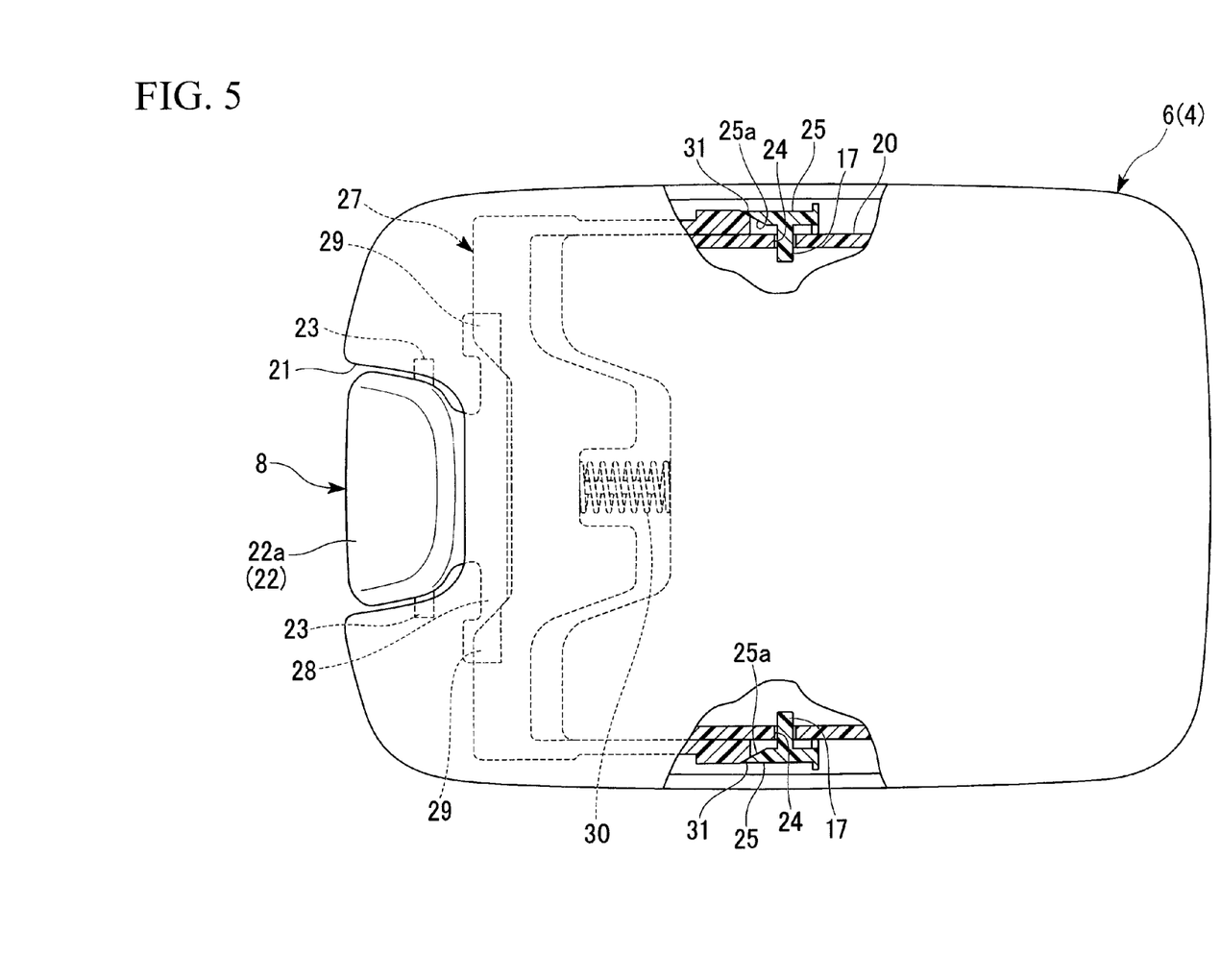
FIG. 5 is a partly exploded top view of the console lid.
Figure 6:
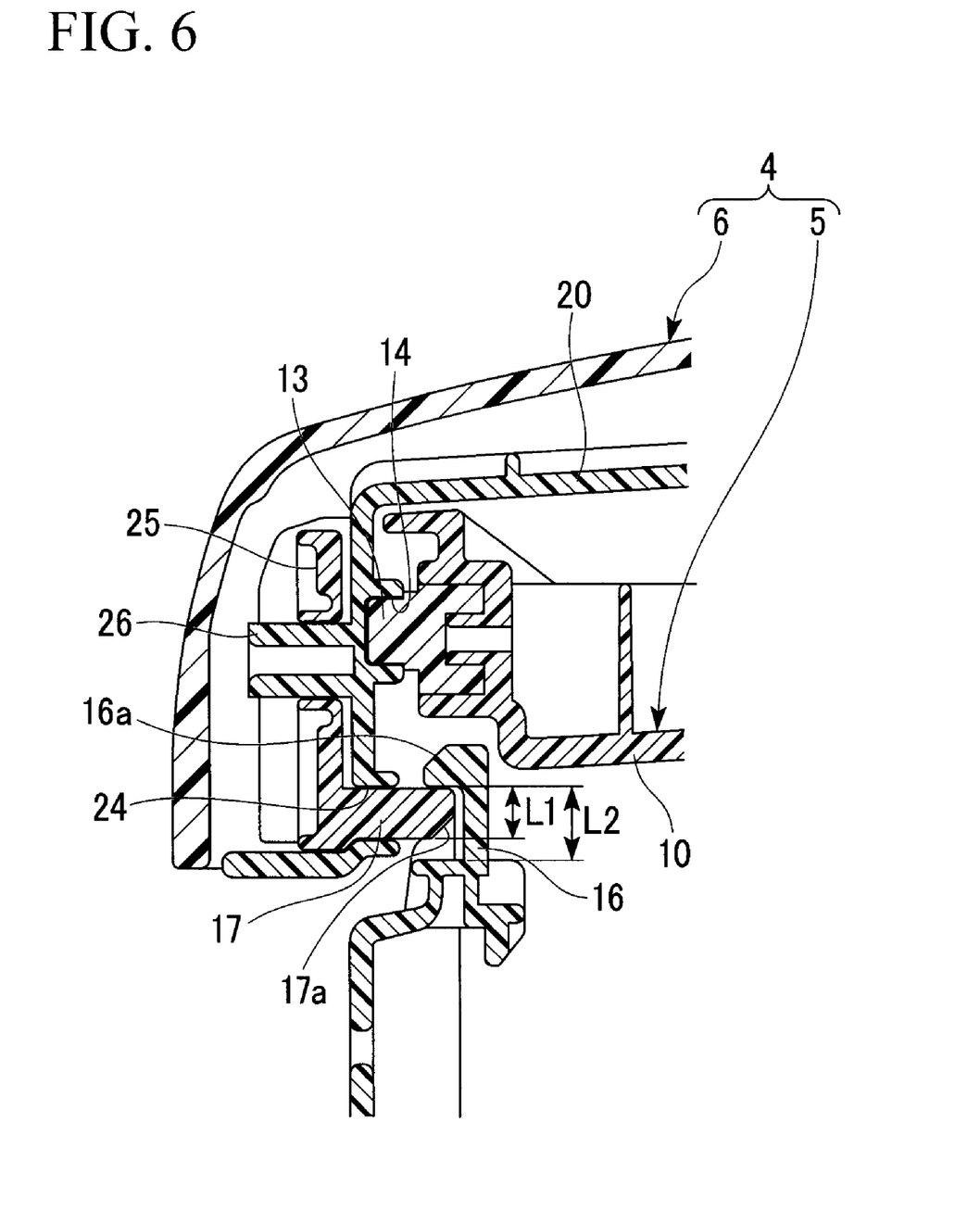
FIG. 6 is a cross-sectional view showing the embodiment, which corresponds to the C-C cross section of FIG. 2.
Figure 7:
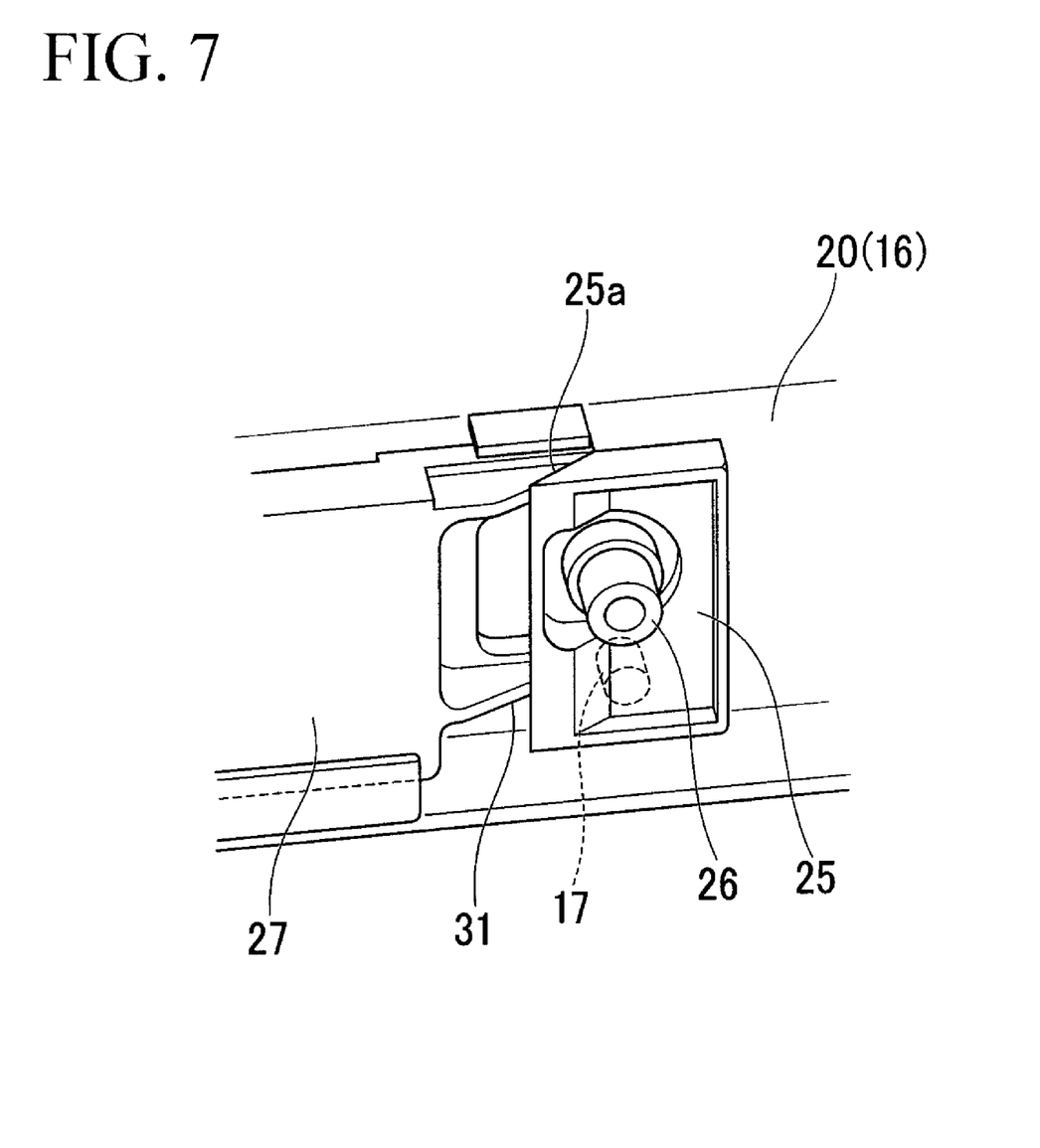
FIG. 7 is an enlarged perspective view showing the embodiment, which corresponds to the D portion of FIG. 2.
Figure 8:
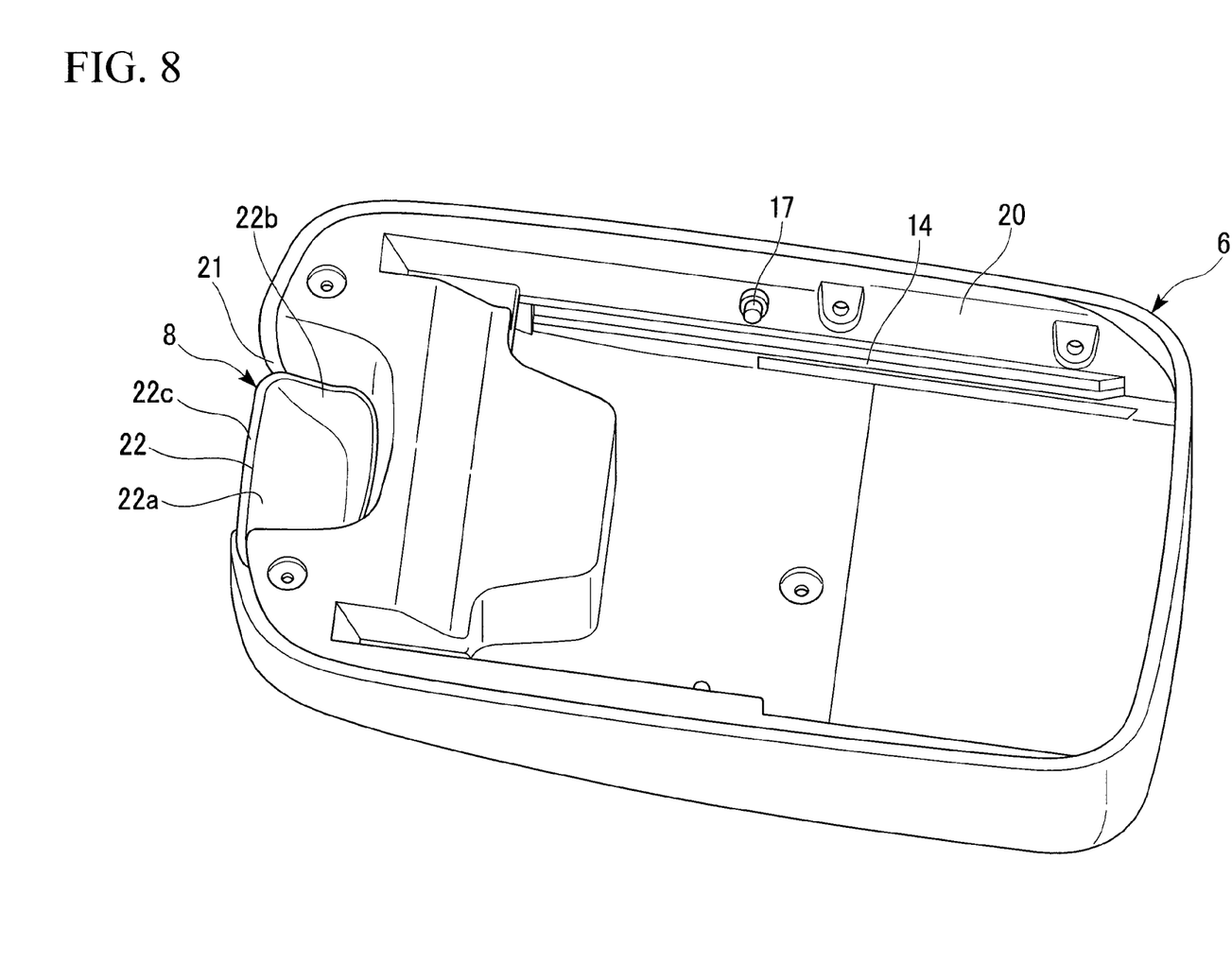
FIG. 8 is a perspective view of a rear side of the console lid.

FIG. 3 and FIG. 4 are partly-exploded side elevational views of the console box 1, FIG. 5 is a partly-exploded planar view of the console lid 4, FIG. 6 is a cross-sectional view corresponding to the C-C cross-section of FIG. 2, FIG. 7 is an enlarged view of the D portion of FIG. 2, and FIG. 8 is a perspective view of the rear side of the console lid 4.

The top surface side of the lid base 5 of the console lid 4 is covered with the lid cover 6 when the lid cover 6 is in an initial slide position. The lid base 5 includes: a rear exposure wall 9 which is exposed outside when the lid cover 6 is slide-displaced in the front direction; an extension wall 10 whose top surface is uneven concaved from the rear exposure wall 9 and which extends on the front side; and a pair of hinge arms 11 which extend downward from both sides of the rear exposure wall 9. Both of these hinge arms 11 are supported on the walls on both sides of the box main unit 3 via a hinge axis 12 (a rotation axis) so as to be rotatable in the up-down direction. On each of the side surfaces on both sides of the extension wall 10, there are protrudingly provided a pair of guide bushes 13 with a substantially rectangular shape in cross section, spaced apart in the front-back direction.

These guide bushes 13 are, as shown in FIG. 3 and FIG. 6, slidably fit into guide grooves 14 which are formed in inner side surfaces of a frame member 20 of the lid cover 6. The guide grooves 14 are formed, as shown also in FIG. 8, along the front-back direction of the lid cover 6 so as to slidably guide the lid cover 6 in the front-back direction with respect to the lid base 5 while the guide grooves 14 are fit into the guide bushes 13. It is preferable that these guide bushes 13 and guide grooves 14 be provided so that they slide at positions higher than the hinge axis 12 (the rotation axis) of the operation lever 8.

On each of the upper end portions of the side walls on the left and right sides of the box main unit 3, there is protrudingly provided a guide wall 16 having a locking groove 15. The locking groove 15 of the respective guide wall 16 opens outwardly in the lateral direction, and is formed in a horizontally longer manner along the front-back direction of the box main unit 3. Into the respective locking grooves 15, there is fit a locking pin 17, which is described later, attached to the lid cover 6. In the rotational locking mechanism 7, the locking pin 17 and the locking groove 15 lock the rotation of the console lid 4. In the upper end portion, closer to the outside, of the respective guide walls 16, there is formed a tapered face 16a (see FIG. 6) which inclines in the direction in which an opening of the locking groove 15 opens.

In a substantially central position in the width direction in the front end portion of the lid cover 6, there is provided a notch portion 21. Within the notch portion 21, a grip portion 22 of the operation lever 8 is arranged. The operation lever 8 is supported so as to be rotatable in the up-down direction by the side walls on both sides which form the notch portion 21. In the figures, reference numeral 23 designates a rotation axis of the operation lever 8. The frame member 20 of the lid cover 6 has, as shown in FIG. 6 and FIG. 8, a bottom surface whose central portion is formed in a concave shape. The aforementioned guide grooves 14 are provided respectively in the upper regions of both side walls which form the concave portion. Through-holes 24, which are respectively fit the aforementioned locking pins 17 so as to freely move back-and-forth, are formed in lower location than the guide grooves 14. Each of the locking pin 17 is protrudingly provided in the vicinity of a lower end of the follower cam piece 25 arranged on an exterior side surface of a side wall of the frame member 20. The locking pin 17 moves back-and-forth in the through-hole 24 in accordance with a displacement of the follower cam piece 25. The follower cam piece 25 is supported by a guide protrusion 26 protrudingly provided on the exterior side of the frame member 20 so as to freely move back-and-forth. The follower cam piece 25 is always biased inwardly in the width direction by a biasing spring (not shown in the figures). In a front end portion of the follower cam piece 25, there is formed a cam face 25a which inclines outwardly in the width direction from its base end to its distal end.

On the other hand, on the top surface of the front end portion of the lid cover 6, there is arranged, as shown in FIG. 2 and FIG. 5, a cam block 27 that is substantially U-shaped in planar view for transforming a pull-up displacement of the front end portion of the operation lever 8 to a push-up displacement outwardly in the width direction of the respective follower cam pieces 25. On a side further rear than the rotation axis of the operation lever 8, there is integrally formed a transmission piece 28 which extends outwardly in the width direction in a substantially T-shaped manner. In the front edge portions of the cam block 27, cam faces 29 are respectively formed with which the respective end portions on both sides of the transmission piece 28 come in contact. The cam faces 29 are inclined toward the lower front side. When the front end portion of the operation lever 8 is pulled upward, the cam faces 29 transform the downgoing force of the transmission piece 28 to the force which moves back the cam block 27 as a whole. The cam block 27 is biased in the front direction by a biasing spring 30, bringing the transmission piece 28 into continuous contact with the cam face 29.

In each of the rear end portions on the left and right sides of the cam block 27, there is formed a cam face 31 which inclines inwardly in the width direction from its base end to its distal end. The cam faces 31 respectively come in contact with the cam faces 25a of the follower cam pieces 25. The follower cam pieces 25 are positioned at their initial positions inwardly in the width direction when the cam block 27 is on the front side. When the cam block 27 is moved back through the pull-up operation on the front end portion of the operation lever 8, the follower cam pieces 25 are pushed up outwardly in the width direction through pressure by the respective cam faces 31 of the cam block 27. At this time, each of the locking pins 17 integral with the follower cam piece 25 is moved back through the through-hole 24. The tip portion of the locking pin 17 is set to be entirely pulled out of the locking groove 15 of the box main unit 3 at this time.

Here, in the respective locking pins 17, there is formed a tapered face 17a which mildly curves toward the bottom surface side of the tip end portion, as shown in FIG. 6. When the console lid 4 is closed while being biased in the front direction by the biasing spring, the tapered face 17a comes in contact with the tapered face 16a of the box main unit 3 and then is pushed in the moving-back direction. At this time, when the tip portion of the locking pin 17 goes over an edge portion of the guide wall 16 to be positioned in the locking groove 15, the locking pin 17 is restored to its protruded state by the force of the biasing spring to be fit into the locking groove 15. A fitting portion dimension L1 (an outer diameter) of the tip portion of the locking pin 17 is set to be sufficiently small compared with a groove width L2 (a groove height) of the locking groove 15 as shown in FIG. 6. Therefore, the tip portion of the locking pin 17 is engaged within the locking groove 15 with ease in the closing operation of the console lid 4.

On both side surfaces of the extension wall 10 of the lid base 5, there is provided a plate spring 33 (a biasing device) with an arc-shaped spring biasing portion 33a at its center, as shown in FIG. 2 and FIG. 4. Each of the plate springs 33 is arranged at a substantially middle position between the pair of front and rear guide bushes 13. The spring biasing portion 33a respectively faces top surfaces of the respective guide walls 16 of the box main unit 3. The spring biasing portion 33a of the respective plate springs 33 comes in contact with a top surface of the guide wall 16, which the spring biasing portion 33a faces when the console lid 4 is closed, to thereby impart spring reaction force in the opening direction to the console lid 4. With the impartment of the spring reaction force in the opening direction of the spring biasing portion 33a, the locking pin 17 comes in contact with the upper wall surface of the lock groove 15. Each of the plate springs 33 is formed of a metal material and its surface is coated with a resin material with high slidability.

Figure 9A:
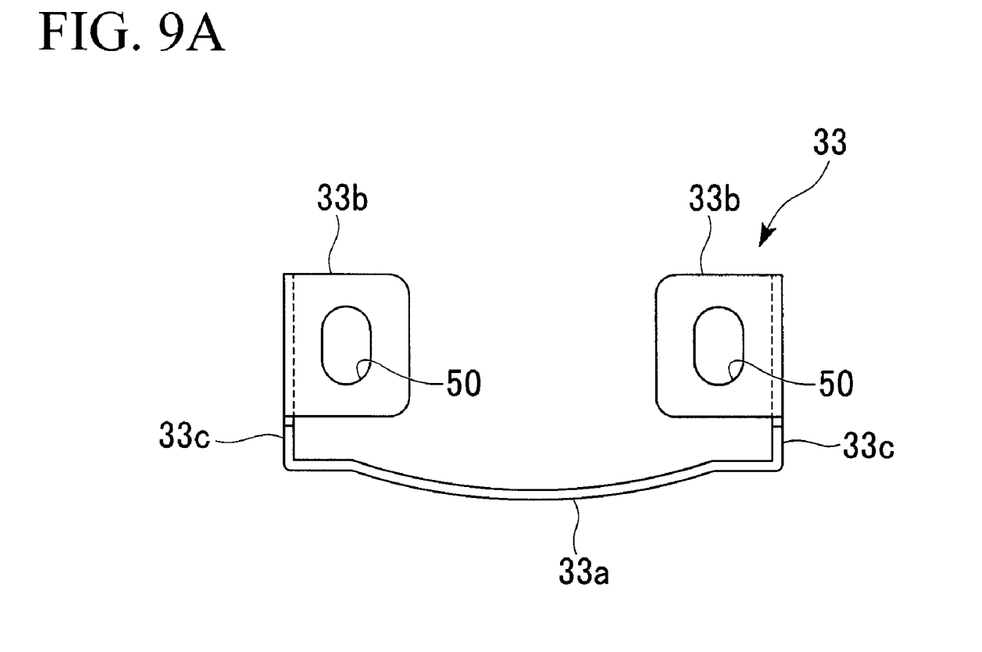
FIG. 9A is a front elevational view of a plate spring of the embodiment.
Figure 9B:
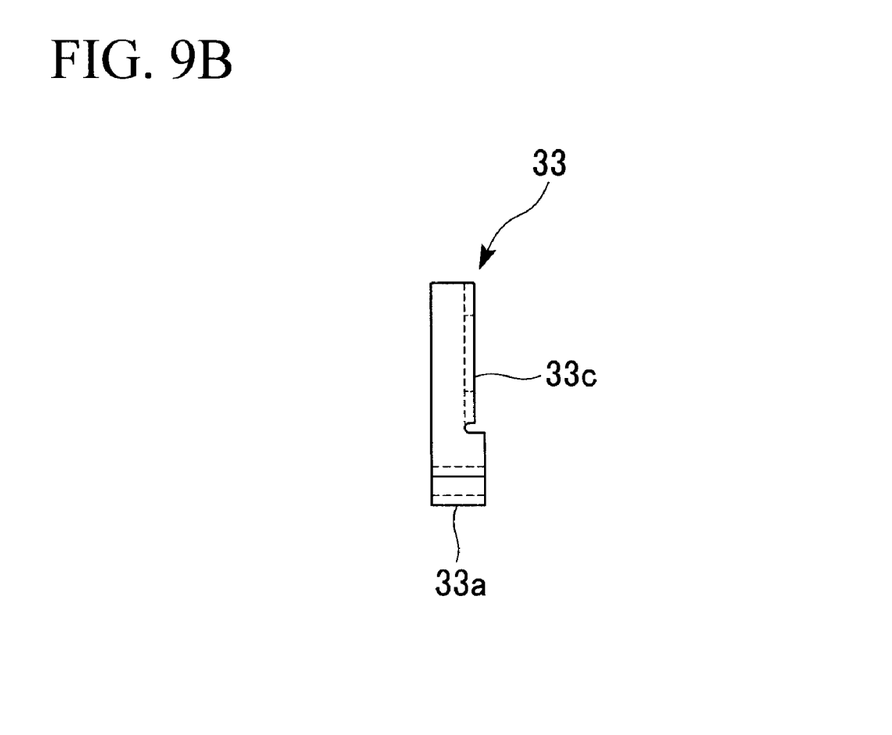
FIG. 9B is a side elevational view of the plate spring of the embodiment.

FIG. 9A is a front elevational view of the plate spring 3 and FIG. 9B is a side elevational view of the plate spring 33. The plate spring 33 includes: a pair of attachment base portions 33b which are attached onto a side surface of the extension wall 10; coupling pieces 33c which are formed of lower ends of the attachment base portions 33b bent in a substantially right angle and whose lower ends extend in the downward direction; and the aforementioned spring biasing portion 33a for coupling the lower ends of these coupling pieces 33c. The respective coupling pieces 33c are fit into slits (not shown in the figures) provided in the side surface of the extension wall 10. Then, the respective attachment base portions 33b are fixed onto the side surface of the extension wall 10 by means of screws (not shown in the figures). Reference numeral 50 in the figure denotes a screw insertion hole in an elongated hole shape provided in the attachment base portion 33b. In the plate spring 33, with the fixation of the coupling pieces 33c on both sides onto the extension wall 10 while they are fit into the slits, the spring biasing portion 33a is possible to face the top surface of the guide wall 16 lying underneath the bottom surface of the extension wall 10 in a state with the rigidity of the base portions on both sides of the spring biasing portion 33a maintained at a high level. Therefore, by attaching the plate spring 33 on the extension wall 10 in this manner, a stable spring reaction force by the spring biasing portion 33a can be obtained.

At a position on the bottom surface further forward than the respective installation portions of the plate springs 33 on both sides of the bottom surface of the extension wall 10, there is attached a stopper member 34 (a restriction device), made from an elastic member such as rubber, which comes in contact with the top surface of the guide wall 16 of the box main unit 3 for restricting an excessive displacement of the console lid 4 in the closing direction. The stopper member 34 can maintain a predetermined space between the bottom surface of the extension wall 10 and the opposing guide wall 16 through biasing force by the plate spring 33. The clearance between the bottom surface of the extension wall 10 and the guide wall 16 by the stopper member 34 when the console lid 4 is locked by the locking pins 17 and the locking grooves 15 is set to be smaller than the clearance in the up-down direction between the locking groove 15 and the locking pin 17 (L2-L1). As a result, when the console lid 4 is closed with great force, or when the console lid 4 is pressed in the down direction, the stopper member 34 prevents that locking pin 17 goes over the locking groove 15 to be pinched into the lower region side of the guide wall 16.

Figure 10:
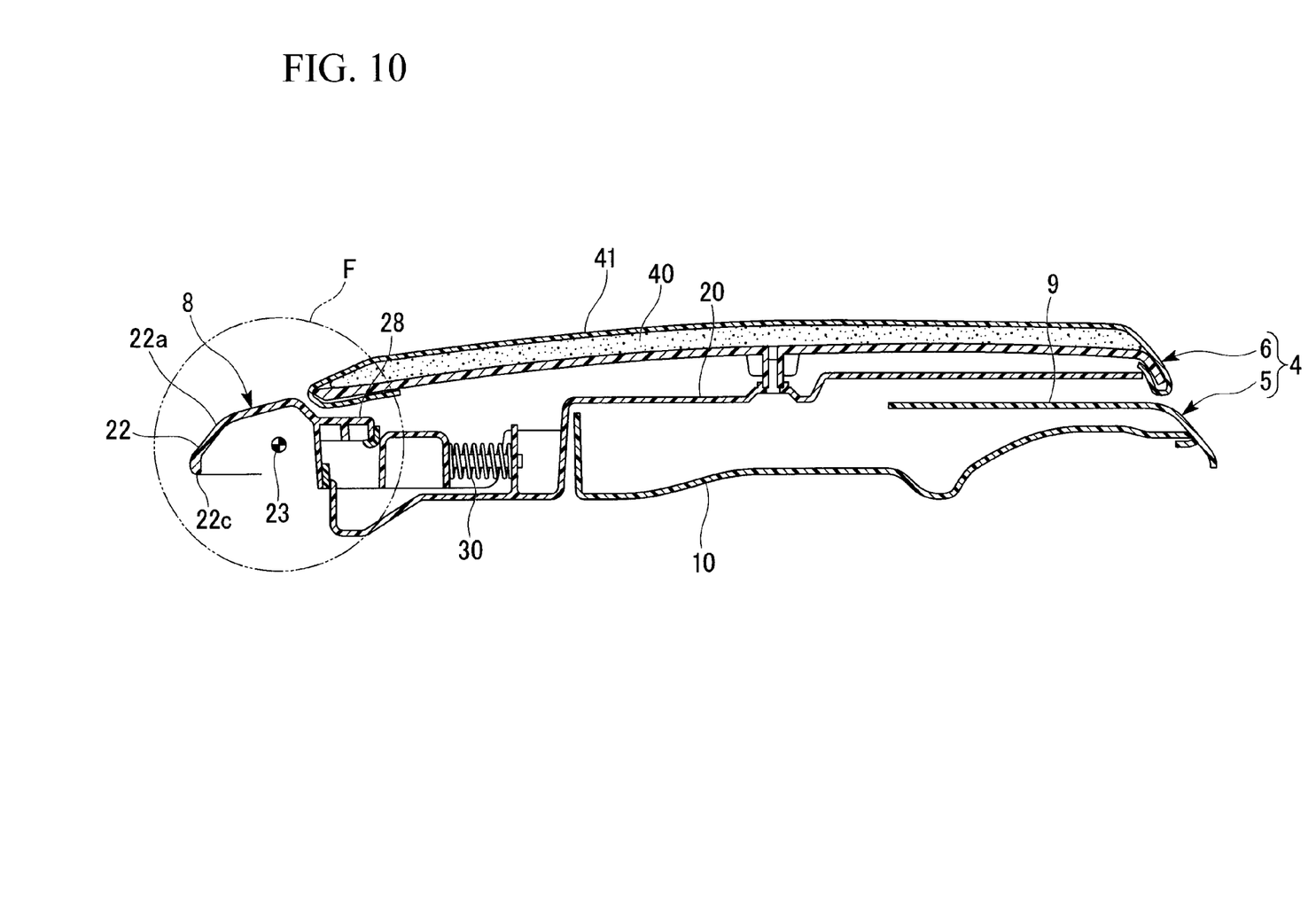
FIG. 10 is a cross-sectional view of the console lid corresponding to the E-E cross section of FIG. 1.
Figure 11:
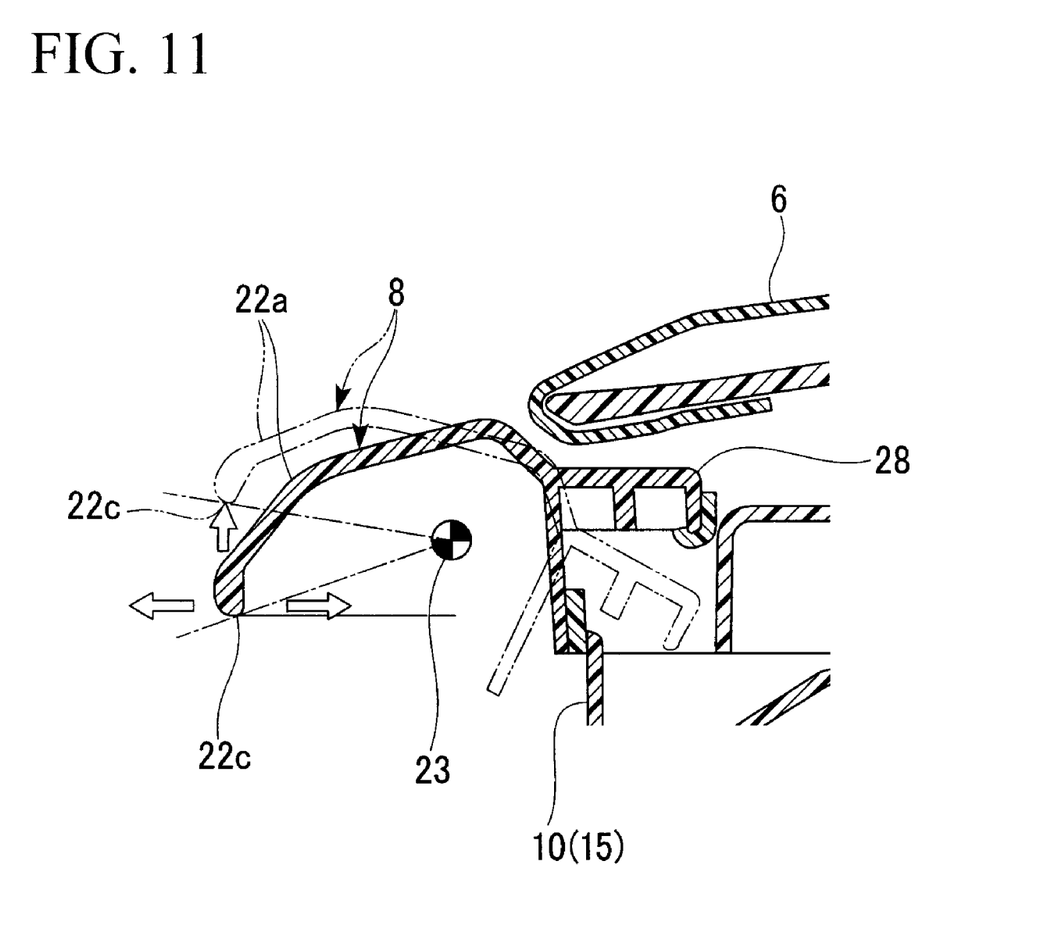
FIG. 11 is an enlarged cross-sectional view of the F portion of FIG. 10.

FIG. 10 is a cross-sectional view corresponding to the E-E cross section of FIG. 1 and FIG. 11 is an enlarged cross-sectional view of the F portion of FIG. 10.

As shown in these figures, the grip portion 22 of the operation lever 8 for releasing the rotational locking mechanism 7 has a curved wall 22a which inclines downwardly from the top surface to the lower front side of the lid cover 6. The curved wall 22a is coupled to side walls 22b (see FIG. 8) respectively on the left and right sides which support the rotation axis 23. When an occupant, after putting his or her palm over the top surface of the curved wall 22a, hooks his or her finger tips over the bottom end of the curved wall 22a and pulls the grip portion 22 upward, the operation lever 8 performs an unlocking operation.

The lower end 22c of the grip portion 22 over which the finger tips of the occupant are hooked is set to be positioned lower than the rotation axis 23 in a default state where the operation lever 8 is not operated on.

In the console box 1 with a configuration as described above, in its default state where the console lid 4 is closed, the locking pins 17 arranged on both sides of the lid cover 6 protrude inwardly in the width direction, and the tip portions thereof fit into the locking grooves 15 of the box main unit 3 to maintain a locked state.

From this state, when the occupant, after putting his or her arm on the top surface of the lid cover 6, hooks his or her finger tips over the grip portion 22 of the operation lever 8 from above and pulls the grip portion 22 upward, the transmission piece 28 of the operation lever 8 is displaced downwardly, and the cam block 27 is pushed down backwardly via the cam faces 29. When the cam block 27 is moved back, the cam faces 31 on the rear end sides of the cam block 27 push up the follower cam pieces 25 on both sides outwardly in the width direction, to thereby move back the left and right locking pins 17 from the locking grooves 15 of the box main unit 3 side. As a result, the lock of the console lid 4 by the locking pins 17 and the locking grooves 15 is released. Afterwards, a lift-up of the front end portion of the console lid 4 by the occupant causes the console lid 4 to rotate about the hinge axis 12. At this time, the lid base 5 and the lid cover 6 of console lid 4 are integrally rotated because they are always retained in the thickness direction by the guide bushes 13 and the guide grooves 14.

In the case where once opened console lid 4 is closed, the locking pins 17 on both sides of the lid cover 6 respectively come in contact, at the tapered faces 17a of the tips thereof, with the tapered faces 16a of the guide walls 16 on both sides. When the front end side of the console lid 4 is further pushed down in this state, the locking pins 17 are pressed in the moving-back direction via the tapered faces 17a, causing the tip portions of the locking pins 17 to go over the edge portions of the guide walls 16 to be fit into the locking grooves 15.

When, in the state with the tip portions of the locking pins 17 in contact with the tapered faces 16a of the guide walls 16, the front end side of the console lid 4 is pressed down as described above, the plate springs attached to the left and right side of the extension wall 10 come in contact with the top surfaces of the corresponding guide walls 16 by the spring biasing portions 33a. The plate spring 33 has stronger reaction force in accordance with a press-down amount of the front end side of the console lid 4. Therefore, in a state with the locking pins 17 being fit into the locking grooves 15, the console lid 4 (the lid cover 6) is biased in the opening direction. Consequently, once the locking pins 17 are fit into the locking grooves 15, the locking pins 17 receive the force of the plate springs 33, to thereby be pressed against the upper walls of the locking grooves 15.

When the front end side of the console lid 4 is pressed down as described above, the stopper members 34 attached to the bottom surface of the extension wall 10 of the lid cover 6 come in contact with the top surfaces of the guide walls 16, to thereby elastically restrict an excessive rotational displacement of the console lid 4.

When force is applied to the lid cover 4 in the front-back direction by the arm of the occupant which is put over the lid cover 6 in a state with the console lid 4 closed, the guide bushes 13 slide in the guide grooves 14, to thereby cause the lid cover 6 to make a sliding displacement in the front-back direction with respect to the lid base 5.

In the console box 1, the lower end 22c of the grip portion 22 over which the finger tips of the occupant are hooked is set to be positioned lower than the rotation axis 23 in the default state where the operation lever 8 is not operated on. Therefore, in the sliding back-and-forth operation on the lid cover 4 in which force is applied in the substantially horizontal direction, the operation lever 8 is never rotated in the lock-releasing direction by mistake even though the finger tips are remained hooked over the grip portion 22, as long as the grip portion 22 is not intentionally pulled upward.

That is, the lower end 22c of the grip portion 22, which is a load input point of the operation lever 8, is positioned lower than the rotation axis 23. Even if a sliding operation in the substantially horizontal direction is applied to the lower end 22c of the grip portion 22, this operation force acts on the operation lever 8 only as a moment in the direction reverse to the lock-releasing direction and never acts as a moment in the lock-releasing direction.

Accordingly, in the console box 1, as long as the grip portion 22 of the operation lever 8 is not intentionally pulled upward, the rotational locking mechanism 7 is not released.

Therefore, a sliding back-and-forth operation and a rotation operation of the console lid 4 can be obtained with no erroneous operation, without inviting further complication of the construction and an increase in the number of parts.

In the console box 1, the fitting portion dimension L1 of the locking pin 17 which is attached to the lid cover 6 is set to be sufficiently smaller than the groove width L2 of the locking groove 15 of the box main unit 3, and the extension wall 10 of the lid cover 6 is provided with the plate springs 33 which impart spring reaction force in the opening direction to the console lid 4. Therefore, with the difference between the fitting portion dimension L1 and the groove width L2, locking operability in the closing operation of the console lid 4 can be made favorable. In addition, force of the plate springs 33 presses the locking pins 17 against the upper walls of the locking grooves 15, to thereby make it possible to securely prevent looseness of the console lid 4 in the locked state.

In the console box 1, the stopper members 34, which come in contact with the top surfaces of the guide walls 16 of the box main unit 3 for restricting an excessive closing displacement of the console lid 4, are provided on the side further forward than the respective installation positions of the plate springs 33 in the extension wall 10 of the lid cover 6. Therefore, with these stopper members 34, a fitting state between the locking pins 17 and the locking grooves 15 can be set and adjusted with ease. The stopper member 34 is formed of an elastic member such as rubber. Therefore, in an initial stage in which the stopper members 34 come in contact with the guide walls 16, the fitting between the locking pins 17 and the locking grooves 15 can be made more secure with a slight displacement in the closing direction allowed for of the console lid 4. In addition, an emission of a contact sound caused by an abrupt closing operation on the console lid 4 can be prevented.

In this embodiment, the external surface of the metal plate spring 33 which is attached to the extension wall 10 of the lid cover 6 is coated with a resin material with high slidability. Consequently, the slidability between the plate spring 33 and the guide wall 16 when the lid cover 6 is slid in the front-back direction or when a heavy load is placed from above can be enhanced. Therefore, looseness in the sliding can be prevented. In addition, generation of wear and rubbing sound of the edge faces of the guide walls 16 can be prevented.

While preferred embodiment of the invention has been described and illustrated above, it should be understood that this is exemplary example of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A console box comprising:
    a box main unit with an opening in an upper portion thereof, one end of a console lid which openably covers the opening being axially supported on the box main unit by a hinge axis; and
    a locking mechanism for restricting a separation between the box main unit and the console lid when the console lid is closed, wherein
    the locking mechanism is provided with:
        a locking groove provided on one of the box main unit and the console lid;
        a locking pin provided on the other of the box main unit and the console lid, the locking pin being fit into the locking groove when the console lid is closed, and having a fitting portion dimension smaller than the groove width of the locking groove; and
        a biasing device provided between the box main unit and the console lid which biases the console lid in an opening direction by contacting between the locking pin and one of wall formed in the locking grove when the console lid is in a closed state.

2. The console box according to claim 1, further comprising
    a restriction device in order to restrict an excessive displacement in a closing direction of the console lid which is provided on at least one of the box main unit and the console lid, on a side further away from the hinge axis than the biasing device.

3. The console box according to claim 1, wherein
    a slidability is provided between the biasing device and the box main unit with which the biasing device comes in contact.

4. The console box according to claim 1, wherein
    the console lid is provided with:
        a lid base rotatably hinge-coupled to the box main unit;
        a lid cover provided on the lid base so as to be slidable in back-and-forth direction; and
        an operation lever rotatably attached to the lid cover for releasing the locking mechanism by a pull-up operation with a hand hooked from above, and wherein
    a lower end of a grip portion of the operation lever is positioned lower than a rotation axis of the operation lever in a state before the locking mechanism is released.

* * * * *